April 12, 1966 C. H. RYSTROM 3,245,258

FLUID METER

Filed Dec. 3, 1962

INVENTOR
Charles H. Rystrom
by Blair, Freeman & Molinare
Attorneys

United States Patent Office 3,245,258
Patented Apr. 12, 1966

3,245,258
FLUID METER
Charles H. Rystrom, R.R. 1, Long Grove, Ill.
Filed Dec. 3, 1962, Ser. No. 241,579
8 Claims. (Cl. 73—261)

This invention relates to a fluid meter, and more particularly to a positive displacement type liquid meter.

Rotary fluid meters of the type utilizing spaced parallel rotors with intermeshing blades to measure the flow of fluid by positive displacement have been known and used more or less successfully for many years. One problem encountered with such meters has been the difficulty of effectively sealing the space between the arcuate tips of the blades of one rotor and the cylindrical hub on the opposite rotor. Both of these surfaces are convex cylindrical surfaces and both are moving, although normally at different lineal speeds, and are very difficult to seal against each other to prevent excessive leakage of liquid therebetween.

Another problem has been encountered in the design and assembly of the meter parts to provide adequate bearing support for the rotors without requiring a complex structure which is difficult and expensive to manufacture and assemble.

It is accordingly one of the objects of the present invention to provide a fluid meter which is easy and inexpensive to manufacture and assemble, in which the parts are effectively sealed against excessive leakage, and which functions accurately to meter flows of fluid from small quantities up to the maximum capacity of the meter.

Another object is to provide a fluid meter in which the rotors are rotable around supporting sleeves fixedly secured to the casing end or ends, and extending in spaced parallel relationship into the casing.

According to a feature of the invention, the supporting sleeves are formed with concave cylindrical cavities on the facing sides thereof against which the arcuate ends of the rotor blades slide in sealing engagement as the rotor turns.

A further object is to provide a fluid meter in which the rotors are interconnected by gears fully enclosed in the meter housing. The gears preferably function as displacement members and the housing is formed with passages to accommodate flow of fluid displaced by the gears.

The above and other objects and features of the invention will be more readily apparent from the following description when read in connection with the accompanying drawing, in which.

Figure 1:
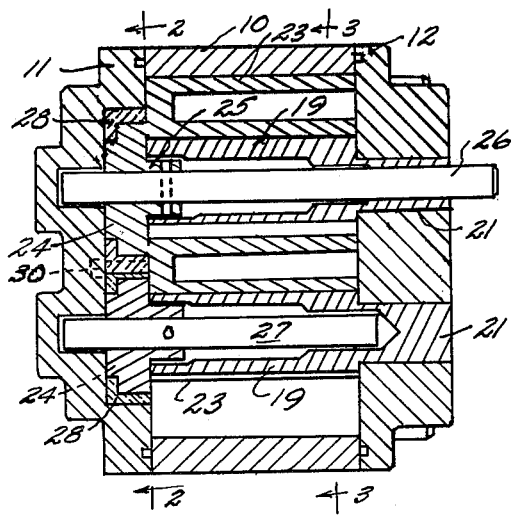
FIG. 1 is a sectional view through a meter embodying the invention.
Figure 2:
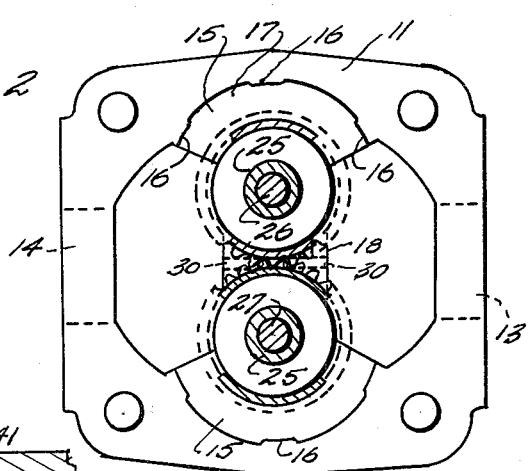
FIG. 2 is a section on the line 2—2 of FIG. 1.
Figure 3:
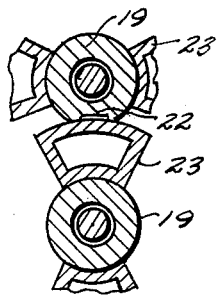
FIG. 3 is a partial section on the line 3—3 of FIG. 1.

As shown in FIGS. 1 to 3, the meter comprises a casing having a central body portion 10 formed with a passaage extending completely therethrough and closed at its opposite ends by closure plates 11 and 12. As best seen in FIG. 2, the central casing portion 10 is formed at its opposite sides with openings 13 and 14, either of which may function as the inlet opening. The two remaining sides of the casing are formed with arcuate recesses 15 which are preferably relieved between short arcuate land portions 16 at the ends and center of the arcuate recesses as shown. The ends of the casing, as seen in FIG. 2, are formed with flat lands 17 extending throughout the extent of the arcuate recesses, and defining smooth end surfaces for sealing against the ends of the rotors. The ends are further formed with raised lands 18 centrally thereof to seal against the ends of the rotors and throughout the remainder of their areas are depressed below the lands so that the necessary machining is minimized and so that wear on the parts will be minimized.

A pair of spaced parallel supporting sleeves 19 are mounted in the casing projecting into the metering chamber from one end of the casing and free at their opposite ends. As shown, the sleeves 19 are provided with projecting hub portions 21, which are fitted closely into bored openings in the casing end 12, and which support the sleeves accurately and rigidly. One of the hub portions 21 may be tubular as shown, for a purpose to appear more fully hereinafter. As best seen in FIG. 3, each of the supporting sleeves is cylindrical and of circular section throughout the major portion of its circumference and is provided with a concave recess 22 at a point in the surface thereof facing the other sleeve. The recesses 22 are preferably concave cylindrical recesses of circular section, except that they may be relieved in the central portions thereof, as shown, to leave concave cylindrical edge surfaces to engage the rotor surfaces.

A rotor is mounted for rotation around each of the supporting sleeves 19 and, as shown, comprises two radially extending blades 23 formed with arcuate outer edges slidably to engage the lands 16 and the cylindrical surfaces of the recesses 22. These parts are preferably formed with a relatively small clearance on the order of .0005 to .0001 inch. With this small clearance, and with the substantial area of overlap between the ends of the blades and the land surfaces, the parts are effectively sealed against leakage therebetween during operation of the meter. The blades of each rotor are connected at one end by a hub 24 which extends into a recess in the opposite end 11. The ends of the blades are flat and will run against the flat surfaces 17 and 18 in sealing engagement therewith to minimum leakage. For additional support the hubs may have short pilot projections 25 which extend rotatably into the ends of the supporting sleeves, as shown to center the rotors relative to the sleeves and to assist in supporting the sleeves. The radial inner surfaces of the sleeves are of circular cylindrical section and fit slidably and sealingly against the outer surface of the supporting sleeves.

The rotors are mounted on shafts 26 and 27 which extend into the respective supporting sleeves and are journaled therein by suitable bearings, as shown. The shaft 26 preferably projects through the tubular hub portion 21 of its supporting sleeve, to the exterior of the casing where it may be drivably connected to a suitable indicating or recording mechanism. At their opposite ends the shafts 26 and 27 are supported in bearings in the end plate 11.

The rotors are interconnected for simultaneous rotation by gears which according to a feature of the invention are enclosed in the meter casing. As shown in FIGS. 1 and 2, the gears are formed on the hub portions 24 of the rotors and mesh directly with each other so that the rotors will turn synchronously with each other, but in opposite directions of rotation. To facilitate formation of the gears in constructions in which the rotors are formed of metal or sintered powdered metal, molded ring members 28 are fitted onto the hubs and are formed on their exterior surfaces with similar gear teeth. By constructing the gears in this manner, the teeth can be formed to extend to the ends of the rotor blades 23 without any fillets which might provide leakage paths. It will be seen that the ends of the teeth fit sealingly against the surface of the receesses in the end member 11 in which the hubs are received so that the leakage around the ends of the teeth is prevented.

Since the gears in this construction will function in the manner of a gear pump to displace fluid from one side to the other of the rotors, provisions must be made to vent the fluid trapped between the gear teeth. As best seen in FIG. 2, the land 18 on the end member 11 is formed with recesses 30 extending from opposite sides thereof to a point near the center to leave a relatively short web which will seal against the ends of the gear teeth at their meshing point. With this construction, fluid displaced by the gear teeth as they mesh with each other can flow through one or the other of the recesses 30 toward the outlet side of the meter. Because of the symmetrical construction, as shown, the meter can be operated in either direction with either one of the ports 13 and 14 functioning as the inlet port and the fluid displaced by the gear teeth will be added to the volume of fluid displaced by the rotor blades.

In operation with fluid entering the inlet opening 13, the upper rotor will turn in a counter-clockwise direction, and the lower rotor will turn in a clockwise direction at the same uniform speed. Fluid displaced by the blades 23 and by the gear teeth will pass through the outlet opening with the quantity of fluid passing per complete revolution being equal to four times the displacement of a single blade plus the gear teeth volume. The rotors are free to turn at all times in response to the fluid pressure acting thereon and will meter the fluid accurately with a minimum possibility of leakage.

Figure 4:
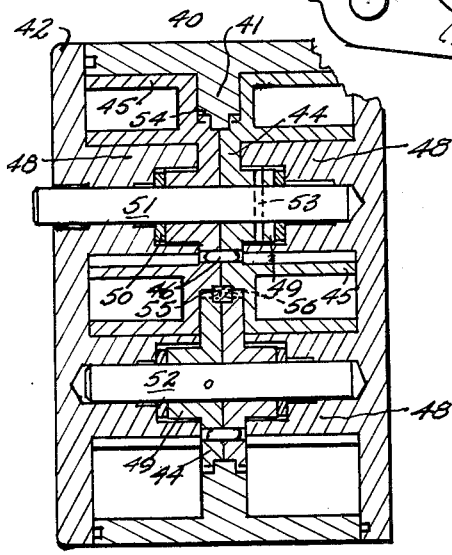
FIG. 4 is a section similar to FIG. 1 of an alternative form of meter.

FIG. 4 shows an alternative construction including a central casing 40 formed with a central web 41 dividing the casing into two metering chambers. The interior of the casing for each metering chamber is similar in configuration to FIG. 2. The ends of the central casing part 40 are closed by end covers 42 and 43, which are formed with lands similar to those shown in FIG. 2 for sealing against the ends of the rotor blades.

In this case the rotors are double elements each having a circular central hub portion 44, with blades 45 extending outward from opposite sides thereof. Preferably the hub portions 44 are split centrally of the width of the total hub and are connected by dowel pins 46 for rotation together. It will be seen that each rotor is formed of two identical halves secured together at the hub portion thereof so that the number of separate parts required is minimized.

Each end plate is formed with two integral supporting sleeves 48 projecting inwardly into the adjacent metering chamber and shaped in the same way as the sleeves 19 of FIGS. 1 to 3. The rotor hubs may be formed with pilot projections 49 extending into the ends of the respective supporting sleeves and bearing against thrust washers 50 in the sleeves. The thrust washers serve accurately to center the rotors in the casing and to absorb any end thrust thereon so that the meter can be operated in either a horizontal or a vertical position, as desired.

Shafts 51 and 52 extend through the respective rotors and are keyed thereto by pins 53 extending through the shafts and registering bores in the rotor hubs. The shaft 51 preferably projects through the end wall 42 of the casing for connection to an indicating or recording device.

In this construction, as in that of FIGS. 1 to 3, the rotors are connected for simultaneous rotation by gear teeth formed on the rotor hubs. In the construction shown in FIG. 4, the rotors may be formed by molding from plastic material, such as delrin, and with this construction the teeth can be molded to extend completely to the end surfaces of the rotor blades 45. As shown, each half of a rotor structure is formed with a set of teeth 54 adjacent to the end of the rotor blade and shorter axially than the length of the hub half to leave a space between the sets of teeth when the rotor halves are assembled. The center web 41 is formed with or carries a bar 55 extending through the space between the sets of teeth at the meshing point of the teeth and this bar is formed in its opposite faces with recesses 56 similar to the recesses 28 shown in FIG. 2 to vent fluid trapped between the teeth at the point of mesh thereof.

With this construction the rotor blades may be made shorter with less overhang from the hubs so that the construction is somewhat sturdier than FIGS. 1 to 3 and can be made to accommodate a greater capacity. In both cases a minimum number of different parts are required and the several parts can be manufactured and machined relatively easily and inexpensively. It will be noted that many of the parts, such as the rotors, can be formed of sintered metal or molded plastic so that they can be shaped inexpensively and with a high degree of accuracy.

While two embodiments of the invention have been shown and described in detail, it will be understood that these are illustrative only and are not to be taken as a definition of the scope of the invention, reference being had for this purpose to the appended claims.

What is claimed is:

1. A fluid meter comprising a hollow casing having spaced ends and defining a metering chamber, a pair of supporting sleeves secured to at least one of the ends and projecting into the metering chamber in spaced parallel relationship to each other, each of said supporting sleeves having a cylindrical outer surface of circular section interrupted by a concave recess at the side thereof adjacent to the other sleeve, a rotor including diametrically spaced blades rotatable around each of the supporting sleeves, each of the rotor blades having an arcuate outer surface for sealing engagement with the surface of the recess in the opposite sleeve, the casing interior being formed with concave recesses at opposite sides thereof and centered in a plane through the axes of the sleeves for sealing engagement with the arcuate outer surfaces of the blades, the casing being formed with fluid flow openings in its opposite sides between the recesses and on opposite sides of said plane, shafts extending rotatably through the supporting sleeves and secured to the rotors respectively, and gears in the metering chamber connected to the rotors and intermeshing to cause simultaneous rotation of the rotors the gears being enclosed by the casing to form a gear motor.

2. A fluid meter comprising a hollow casing having spaced ends and defining a metering chamber, a pair of cylindrical supporting sleeves secured to one of the ends and projecting into the metering chamber in spaced parallel relationship to each other, a rotor including angularly spaced blades rotatable around each of the supporting sleeves, each of the rotor blades having an arcuate outer surface for sealing engagement with the surface of the opposite sleeve, the casing interior being formed with concave recesses at opposite sides thereof for sealing engagement with the arcuate outer surfaces of the blades, the casing being formed with fluid flow openings in its opposite sides between the recesses, the rotor blades being connected at one end of each rotor by a hub of circular section fitting into recesses in the casing gear teeth on the hubs intermeshing with each other to cause simultaneous rotation of the rotors and means in the casing defining a passage communicating with the gear therewith adjacent to and at one side of the point of mesh and with the outlet opening whereby the gear therewith can function as a gear motor during operation of the meter.

3. A fluid meter comprising a hollow casing having spaced ends and defining a metering chamber, a pair of supporting sleeves secured to one of the ends and projecting into the metering chamber in spaced parallel relationship to each other, each of said supporting sleeves having a cylindrical outer surface of circular section interrupted by a concave recess at the side thereof adjacent to the other sleeve, a rotor including diametrically spaced blades rotatable around each of the supporting sleeves, each of the rotor blades having an arcuate outer surface for sealing engagement with the surface of the recess in the opposite sleeve, the casing interior being formed with concave recesses at opposite sides thereof for sealing engagement with the arcuate outer surfaces of the blades, the casing being formed with fluid flow openings in its opposite sides between the recesses, the rotor blades of each rotor being connected at one end by a hub of circular section fitting into a recess in the adjacent casing end, gear teeth on the hubs intermeshing with each other, and a land on the casing end engaging the ends of the gear teeth at their point of meshing and being relieved at both sides of the point of meshing whereby the gear teeth can function as a gear motor during operation of the meter in either direction.

4. A fluid meter comprising a hollow casing having spaced ends and a central web between and parallel to the ends and formed with a pair of spaced openings therethrough and defining a metering chamber on each side of the openings, a pair of spaced supporting sleeves on each of the casing ends projecting toward the respective openings, each of the supporting sleeves having an outer surface of circular section interrupted by a concave recess at the side thereof adjacent to the other sleeve, a pair of rotors each having a central hub portion fitting rotatably in one of said openings and diametrically spaced blades extending from opposite sides thereof and rotatable around the adjacent supporting sleeves, each of the rotor blades having an arcuate outer surface for sealing engagement with the surface of the recess in the opposite sleeve, the casing interior being formed with concave recesses in opposite sides thereof for sealing engagement with the arcuate outer surfaces of the blades, and the casing being formed with fluid flow openings on its opposite sides between the recesses.

5. The fluid meter of claim 4 in which each of the rotors is formed of two identical halves assembled on opposite sides of the central web and secured together through their hub portions.

6. The fluid meter of claim 4 in which the hub portion of each rotor is formed wtih a pilot projection at each side thereof fitting rotatably in the end of the adjacent supporting sleeve and including a thrust bearing in the sleeve engaging the end of the pilot projection.

7. A fluid meter comprising a hollow casing having spaced ends and a central web formed with a pair of spaced openings therethrough and defining a metering chamber on each side of the openings, a pair of spaced supporting sleeves on each of the casing ends projecting toward the respective openings, each of the supporting sleeves having an outer surface of circular section interrupted by a concave recess at the side thereof adjacent to the other sleeve, a pair of rotors each having a central hub portion fitting rotatably in one of said openings and diametrically spaced blades extending from opposite sides thereof and rotatable around the adjacent supporting sleeves, each of the rotor blades having an arcuate outer surface for sealing engagement with the surface of the recess in the opposite sleeve, the casing interior being formed with concave recesses in opposite sides thereof for sealing engagement with the arcuate outer surfaces of the blades, the casing being formed with fluid flow openings on its opposite sides between the recesses, the rotor hubs being formed with intermeshing teeth at least one side thereof and leaving a space opposite to the ends of the teeth, and a bar on the central web extending between the rotor hubs and engaging the ends of the teeth at their meshing point, the bar being relieved at opposite sides of the meshing point for passage of fluid displaced by the teeth.

8. A fluid meter comprising a hollow casing having spaced ends and a central web formed with a pair of spaced openings therethrough and defining a metering chamber on each side of the openings, a pair of spaced supporting sleeves on each of the casing ends projecting toward the respective openings, each of the supporting sleeves having an outer surface of circular section interrupted by a concave recess at the side thereof adjacent to the other sleeve, a pair of rotors each having a central hub portion fitting rotatably in one of said openings and diametrically spaced blades extending from opposite sides thereof and rotatable around the adjacent supporting sleeves, each of the rotor blades having an arcuate outer surface for sealing engagement with the surface of the recess in the opposite sleeve, the casing interior being formed with concave recesses in opposite sides thereof for sealing engagement with the arcuate outer surfaces of the blades, the casing being formed with fluid flow openings on its opposite sides between the recesses, each of the rotors being formed of two identical halves connected at their hub portions, each rotor half having a set of gear teeth adjacent to the blades terminating short of the end of the hub portion to leave a space between the sets of teeth, and a bar on the central web extending through said space and sealing against the ends of the teeth at their meshing point, the bar being relieved at opposite sides of the meshing point for passage of fluid displaced by the teeth.

References Cited by the Examiner
UNITED STATES PATENTS

| | | | |
|---|---|---|---|
| 593,514 | 11/1897 | Chaudin | 123—12 |
| 738,836 | 9/1903 | Northrup | 73—261 |
| 1,029,157 | 6/1912 | Ullman | 103—126 |
| 1,528,728 | 3/1925 | Houghton et al. | 73—261 |
| 2,262,231 | 11/1941 | Guibert et al. | 73—261 |
| 2,519,557 | 8/1950 | Flanagan | 230—141 |

FOREIGN PATENTS

| | | |
|---|---|---|
| 784,022 | 4/1935 | France. |
| 419,221 | 11/1934 | Great Britain. |

RICHARD C. QUEISSER, *Primary Examiner.*

DAVID SCHONBERG, *Examiner.*